United States Patent
Matsuo

(10) Patent No.: US 10,761,415 B2
(45) Date of Patent: Sep. 1, 2020

(54) PROJECTION OPTICAL SYSTEM AND PROJECTOR APPARATUS

(71) Applicant: NITTOH INC., Suwa-shi, Nagano (JP)

(72) Inventor: Takahiko Matsuo, Nagano (JP)

(73) Assignee: NITTOH INC., Suwa-Shi, Nagano (JP)

(*) Notice: Subject to any disclaimer, the term of this patent is extended or adjusted under 35 U.S.C. 154(b) by 1 day.

(21) Appl. No.: 15/695,535

(22) Filed: Sep. 5, 2017

(65) Prior Publication Data

US 2017/0363944 A1 Dec. 21, 2017

Related U.S. Application Data

(62) Division of application No. 14/400,820, filed as application No. PCT/JP2013/007653 on Dec. 26, 2013, now Pat. No. 9,785,043.

(30) Foreign Application Priority Data

Dec. 28, 2012 (JP) .................................. 2012-287877

(51) Int. Cl.
*G03B 21/53* (2006.01)
*G02B 13/16* (2006.01)
(Continued)

(52) U.S. Cl.
CPC ............ *G03B 21/53* (2013.01); *G02B 7/028* (2013.01); *G02B 7/04* (2013.01); *G02B 13/16* (2013.01);
(Continued)

(58) Field of Classification Search
CPC .. G02B 17/028; G02B 17/0896; G02B 7/028; G02B 7/04; G02B 13/16; G02B 13/22;
(Continued)

(56) References Cited

U.S. PATENT DOCUMENTS 5,627,685 A * 5/1997 Yamanashi ............ G02B 13/02
359/745
7,227,682 B2 6/2007 Caldwell
(Continued)

FOREIGN PATENT DOCUMENTS

JP 2002122785 A 4/2002
JP 2004-258620 9/2004
(Continued)

OTHER PUBLICATIONS

PCT, International Search Report and Written Opinion, International Application No. PCT/JP2013/007653; dated Jul. 9, 2015, 11 pages.

*Primary Examiner* — Michelle M Iacoletti
*Assistant Examiner* — Christopher A Lamb, II
(74) *Attorney, Agent, or Firm* — Thompson Hine LLP

(57) ABSTRACT

A projection optical system (2) projects from a DMD (7) on a reducing side onto a screen (9) on an enlargement side, and includes: a first refractive optical system (10) that forms a first intermediate image (51) on the enlargement side using light incident from the reducing side; a second refractive optical system (20) that forms the first intermediate image (51) on the reducing side into a second intermediate image (52) on the enlargement side; and a first reflective optical system (30) including a first reflective surface (31a) with positive refractive power that is positioned on the enlargement side of the second intermediate image (52), wherein the second refractive optical system (20) includes a first focus lens group (61) that moves when focusing is carried out, and the first focus lens group (61) includes at least one lens (L13) included in the second refractive optical system (20).

15 Claims, 14 Drawing Sheets

(51) Int. Cl.
*G02B 17/08* (2006.01)
*G02B 7/04* (2006.01)
*G03B 21/00* (2006.01)
*G03B 21/28* (2006.01)
*G02B 7/02* (2006.01)

(52) U.S. Cl.
CPC ......... *G02B 17/08* (2013.01); *G02B 17/0896* (2013.01); *G03B 21/005* (2013.01); *G03B 21/28* (2013.01)

(58) Field of Classification Search
CPC ........... G02B 17/08–0896; G02B 17/00–0896; G02B 7/00–40; G02B 13/00–26; G03B 21/005; G03B 21/53; G03B 21/28; G03B 21/00–64; H04N 9/315; H04N 9/3105; H04N 9/3152
See application file for complete search history.

(56) References Cited

U.S. PATENT DOCUMENTS

| | | | | |
|---|---|---|---|---|
| 2003/0169405 A1* | 9/2003 | Agostinelli | ........... | G02B 27/225 353/7 |
| 2003/0231404 A1* | 12/2003 | Nagahara | ........... | G02B 13/22 359/680 |
| 2004/0156117 A1 | 8/2004 | Takaura et al. | | |
| 2006/0227415 A1 | 10/2006 | Caldwell | | |
| 2007/0182940 A1 | 8/2007 | Asai | | |
| 2010/0053737 A1* | 3/2010 | Fujita | ........... | G02B 17/08 359/364 |
| 2010/0097581 A1* | 4/2010 | Yamada | ........... | G02B 17/08 353/70 |
| 2010/0195061 A1 | 8/2010 | Takaura et al. | | |
| 2010/0238416 A1 | 9/2010 | Kuwata et al. | | |
| 2011/0019109 A1* | 1/2011 | Maeda | ........... | G03B 21/00 348/745 |
| 2011/0267687 A1 | 11/2011 | Kim et al. | | |
| 2011/0273674 A1 | 11/2011 | Ishida | | |
| 2012/0120484 A1* | 5/2012 | Konuma | ........... | G02B 13/16 359/364 |
| 2013/0107233 A1* | 5/2013 | Hirakawa | ........... | G03B 21/28 353/99 |
| 2014/0002802 A1 | 1/2014 | Hsu | | |
| 2014/0111868 A1* | 4/2014 | Nagatoshi | ........... | G02B 15/177 359/680 |

FOREIGN PATENT DOCUMENTS

| | | |
|---|---|---|
| JP | 2007-011248 | 1/2007 |
| JP | 2007-241260 | 9/2007 |
| JP | 2008096983 A | 4/2008 |
| JP | 2008096984 A | 4/2008 |
| JP | 2008-536175 | 9/2008 |
| JP | 2009-086315 | 4/2009 |
| JP | 2010-244017 | 10/2010 |
| JP | 2011-237482 | 11/2011 |
| JP | 2011242606 A | 12/2011 |
| JP | 2012-108267 | 6/2012 |
| WO | WO 2006/110283 | 10/2006 |
| WO | WO 2013/005444 | 1/2013 |
| WO | WO-2013001759 A1 * | 1/2013 ........... G02B 15/177 |

* cited by examiner

Fig. 4

| LENS SURFACE NUMBER | RADIUS OF CURVATURE (Ri) | DISTANCE (di) | REFRACTIVE INDEX (nd) | ABBE NUMBER ($\nu$d) | LENS NAME | |
|---|---|---|---|---|---|---|
| LIGHT VALVE | Flat | 1.15 | | | | |
| COVER GLASS | Flat | 1.05 | 1.4875 | 70.2 | | |
| | Flat | 22.30 | | | | |
| 1 | 17.57 | 4.30 | 1.7130 | 53.9 | L1 | |
| 2 | −36.87 | 0.15 | | | | |
| 3 | 72.30 | 3.20 | 1.5891 | 61.1 | L2 | LB1 |
| 4 | −17.76 | 3.00 | 1.8467 | 23.8 | L3 | |
| 5 | 19.71 | 11.35 | | | | |
| 6 | 329.22 | 7.50 | 1.5955 | 39.2 | L4 | |
| 7 | −22.11 | 18.20 | | | | |
| 8 | 37.31 | 9.60 | 1.6031 | 60.6 | L5 | |
| 9 | −316.20 | 20.25 | | | | |
| 10 | −13.69 | 5.00 | 1.5311 | 55.8 | L6 | |
| 11 | −27.27 | V1 | | | | |
| 12 | 37.62 | 7.00 | 1.5311 | 55.8 | L7 | |
| 13 | 211.62 | V2 | | | | |
| 14 | 134.85 | 6.90 | 1.6541 | 39.7 | L8 | |
| 15 | −40.21 | 17.05 | | | | |
| 16 | 37.79 | 3.40 | 1.8040 | 46.6 | L9 | |
| 17 | 232.83 | 1.74 | | | | |
| 18 | 72.46 | 3.00 | 1.9037 | 31.3 | L10 | LB2 |
| 19 | 16.70 | 5.10 | 1.4875 | 70.2 | L11 | |
| 20 | −31.42 | 68.74 | | | | |
| FIRST REFLECTIVE SURFACE | −24.54 | V3 | | | | |
| SCREEN | | | | | | |

| DISTANCE (di) | P1 | P2 |
|---|---|---|
| V1 | 13.93 | 13.29 |
| V2 | 26.09 | 26.73 |
| V3 | −550.00 | −700.00 |

(b)

| | P1 | P2 |
|---|---|---|
| FOCAL LENGTH | 4.65 | 4.69 |
| F NUMBER | 2.50 | |
| HALF IMAGE ANGLE | 70.40 | 40.20 |

(c)

| | K | A3 | A4 | A6 | A8 | A10 | A12 | A14 |
|---|---|---|---|---|---|---|---|---|
| S3 | 0.0000 | 0.0000 | −8.0566E−05 | −5.2680E−07 | 2.6060E−08 | −8.0620E−10 | 9.5690E−12 | 0.0000 |
| S10 | −1.7620 | 0.0000 | −6.0710E−05 | −2.9240E−07 | 3.4130E−09 | −1.1540E−11 | 1.8410E−14 | −1.1740E−17 |
| S11 | −14.5400 | 0.0000 | −7.1430E−05 | −6.2740E−08 | 6.9110E−10 | −8.1850E−13 | −6.0270E−16 | 1.3380E−18 |
| S12 | 0.0000 | 0.0000 | −1.8790E−05 | 4.5830E−07 | −3.0740E−09 | 9.7890E−12 | −1.5490E−14 | 9.8370E−18 |
| S13 | 0.0000 | 0.0000 | −3.5260E−06 | 2.7290E−07 | −2.0920E−09 | 7.1520E−12 | −1.1840E−14 | 7.7250E−18 |
| FIRST REFLECTIVE SURFACE | −1.7710 | 1.2060E−05 | −2.4490E−06 | −1.5470E−09 | 2.0280E−12 | −1.2790E−15 | 3.5040E−19 | 0.0000 |

COMA ABERRATION (mm)

DISTORTION (mm)

DISTORTION (mm)

Fig. 12

| LENS SURFACE NUMBER | RADIUS OF CURVATURE (Ri) | DISTANCE (di) | REFRACTIVE INDEX (nd) | ABBE NUMBER ($\nu$d) | LENS NAME | |
|---|---|---|---|---|---|---|
| LIGHT VALVE | Flat | 1.00 | | | | |
| COVER GLASS | Flat | 3.00 | 1.5085 | 61.2 | | |
| | Flat | 1.00 | | | | |
| PRISM | Flat | 25.00 | 1.5891 | 61.3 | | |
| | Flat | 13.00 | | | | |
| 1 | −300.00 | 8.00 | 1.6180 | 63.3 | L1 | |
| 2 | −37.33 | V1 | | | | |
| 3 | 67.51 | 4.60 | 1.8467 | 23.8 | L2 | |
| 4 | 525.46 | 10.16 | | | | |
| 5 | 71.42 | 1.60 | 1.9108 | 35.2 | L3 | |
| 6 | 18.73 | 11.00 | 1.5952 | 67.7 | L4 | LB1 |
| 7 | −20.42 | 1.40 | 1.8000 | 29.8 | L5 | |
| 8 | −99.46 | 2.01 | | | | |
| 9 | −46.15 | 1.40 | 1.6889 | 31.1 | L6 | LB2 |
| 10 | 20.57 | 8.00 | 1.6968 | 55.5 | L7 | |
| 11 | −64.08 | 2.87 | | | | |
| STOP | Flat | 23.35 | | | | |
| 12 | −312.00 | 4.50 | 1.8052 | 25.4 | L8 | |
| 13 | −48.78 | V2 | | | | |
| 14 | 63.00 | 10.00 | 1.6968 | 55.5 | L9 | |
| 15 | −88.76 | 15.34 | | | | |
| 16 | −19.17 | 6.00 | 1.5311 | 55.8 | L10 | |
| 17 | −75.63 | 1.00 | | | | |
| 18 | −2793.38 | 2.00 | 1.8052 | 25.4 | L11 | LB3 |
| 19 | 36.98 | 8.00 | 1.7620 | 40.1 | L12 | |
| 20 | −168.20 | V3 | | | | |
| 21 | 56.74 | 4.50 | 1.5311 | 55.8 | L13 | |
| 22 | 104.97 | V4 | | | | |
| 23 | −177.91 | 5.00 | 1.8052 | 25.4 | L14 | |
| 24 | −40.45 | 8.20 | | | | |
| 25 | −59.10 | 5.00 | 1.4970 | 81.5 | L15 | |
| 26 | −26.92 | 1.29 | | | | |
| 27 | −139.46 | 5.00 | 1.4388 | 94.9 | L16 | |
| 28 | −29.18 | 10.72 | | | | |
| 29 | 40.24 | 2.80 | 1.7432 | 49.3 | L17 | LB4 |
| 30 | 16.15 | 7.00 | 1.4970 | 81.5 | L18 | |
| 31 | −33.86 | 65.38 | | | | |
| FIRST REFLECTIVE SURFACE | −25.10 | V5 | | | | |
| SCREEN | | | | | | |

| DISTANCE (di) | P1 | P2 |
|---|---|---|
| V1 | 3.57 | 4.53 |
| V2 | 43.33 | 42.38 |
| V3 | 12.70 | 14.47 |
| V4 | 10.79 | 9.01 |
| V5 | −469.00 | −1449.00 |

(b)

|  | P1 | P2 |
|---|---|---|
| FOCAL LENGTH | 5.44 | 5.47 |
| F NUMBER | 2.00 | |
| HALF IMAGE ANGLE | 69.40 | 69.20 |

(c)

|  | K | A4 | A6 | A8 | A10 | A12 |
|---|---|---|---|---|---|---|
| S16 | −0.7840 | −5.4560E−05 | 1.7520E−07 | −3.1870E−10 | 4.0160E−13 | −1.9330E−16 |
| S17 | 0.0000 | −8.2850E−05 | 1.5820E−07 | −1.9370E−10 | 1.4850E−13 | −3.1030E−17 |
| S21 | 0.0000 | −1.0080E−04 | 1.2100E−06 | −6.3270E−09 | 1.6330E−11 | −1.6820E−14 |
| S22 | 0.0000 | −3.4090E−05 | 6.6760E−07 | −3.8950E−09 | 1.1280E−11 | −1.3090E−14 |
| FIRST REFLECTIVE SURFACE | −0.9920 | 3.2080E−06 | −3.1970E−09 | 1.8130E−12 | −7.1440E−16 | 1.5470E−19 |

PROJECTION OPTICAL SYSTEM AND PROJECTOR APPARATUS

CROSS-REFERENCES

This application is a divisional of U.S. application Ser. No. 14/400,820, filed Nov. 13, 2014, which is a 371 National Stage of PCT/JP2013/007653, filed Dec. 26, 2013, which applications are incorporated herein by reference.

TECHNICAL FIELD

The present invention relates to a projection optical system of a projector apparatus.

BACKGROUND ART

Japanese Laid-Open Patent Publication No. 2004-258620 (hereinafter "Document 1") discloses the realization of a projection optical system which, in addition to using an image forming optical system including a reflective surface to increase the size on the screen of projected images while reducing the projection space outside a projector apparatus, is capable of correcting chromatic aberration and also an image projecting apparatus that uses such projection optical system. To do so, Document 1 discloses that a first and second optical system are disposed in that order from a light valve on the projection side of the light valve, the first optical system includes at least one refractive optical system and has positive refractive power, the second optical system includes at least one reflective surface with refractive power and has positive refractive power, an image formed by the light valve is formed into an intermediate image on the light path of the first and second optical systems, and the intermediate image is enlarged further and projected onto a screen.

DISCLOSURE OF THE INVENTION

In a variety of applications such as presentations and schools and education, there is demand for a projection lens system that projects images that are sharp and wide angle.

A first aspect of the present invention is a projection optical system that projects from a first image plane on a reducing side onto a second image plane on an enlargement side. The projection optical system includes: a first refractive optical system that forms a first intermediate image on the enlargement side using light incident from the reducing side; a second refractive optical system that forms the first image on the reducing side into a second intermediate image on the enlargement side; and a first reflective optical system including a first reflective surface with positive refractive power that is positioned on the enlargement side of the second intermediate image, wherein the second refractive optical system includes a first focus lens group that moves when focusing is carried out, and the first focus lens group includes at least one lens included in the second refractive optical system.

In this projection optical system, the first refractive optical system forms a first intermediate image, the second refractive optical system forms the first intermediate image into a second intermediate image on the enlargement side, and the second intermediate image is enlarged and reflected by the first reflected surface. It is not easy to provide a system with a design where the aberration produced when the second intermediate image is enlarged and reflected is corrected at the first reflective surface. But, in this projection optical system, the second refractive optical system can form the second intermediate image so as to curvature of field and the like produced by the first reflective surface are corrected, and the first refractive optical system can form a first intermediate image in which coma aberration and the like produced by the second refractive optical system are corrected. Accordingly, it is easy to project sharp enlarged images. In addition, in this projection optical system, when carrying out focusing, a first focus lens group including at least one lens out of the second refractive optical system is moved. By this focus lens group, it is easy to form a second intermediate image where fluctuations in aberration that accompany changes in the projection distance and the like are corrected and easy to suppress fluctuations in the image formation performance for the projected images.

With a projection optical system that is wide-angle and has a short focal length, it is easy to produce a deep depth of field and a deep depth of focus. For this reason, although it is easy to suppress fluctuations in focus near the center of the projected images that accompany changes in the optical distance (projection distance) between the first reflective surface and the second image plane, there is also a tendency for fluctuations in curvature of field to increase in the periphery of the projected images. Accordingly, it is desirable for the first focus lens group to include a first distance correcting lens group that moves when focusing is carried out in response to changes in an optical distance between the first reflective surface and the second image plane. It becomes easy to project sharp enlarged images in which fluctuations in curvature of field that accompany changes in the projection distance are corrected.

It is easy to separate image flux for each image angle in the vicinity of the image formation position of the first intermediate image. For this reason, it is desirable for the first distance correcting lens group to include a first lens that is positioned closest to a reducing side of the second refractive optical system. When carrying out focusing, by moving the first lens that is closest to the first intermediate image, it is possible to carry out fine adjustment of focus while suppressing fluctuations in aberration that accompany focusing. Accordingly, it is easy to project sharp, enlarged images in which focus fluctuations that accompany changes in the projection distance are more thoroughly suppressed.

It is desirable for the first focus lens group to include a first temperature correcting lens group that moves when focusing is carried out in response to changes in the peripheral temperature of the projection optical system. More sharp enlarged images is projected in which fluctuations in focus due to changes in the refractive indices of lenses that accompany changes in the temperature of the periphery of the projection optical system are corrected.

It is desirable for the first refractive optical system to include a second focus lens group that moves when focusing is carried out, and for the second focus lens group to include at least one lens included in the first refractive optical system. When carrying out focusing, by moving the second focus lens group that includes at least one lens out of the first refractive optical system, it is possible to reduce the movement distance of the first focus lens group. This means that it is possible to suppress interference between the first focus lens group and the first intermediate image and possible to carry out focusing by hardly moving the image formation position of the first intermediate image. Accordingly, it is possible to provide a compact projection optical system where it is easy to suppress fluctuations in the image formation performance for projected images.

It is desirable for the second focus lens group to include a second distance correcting lens group that moves when focusing is carried out in response to changes in an optical distance between the first reflective surface and the second image plane. It is easy to project a sharp enlarged image where fluctuations in focus that accompany changes in the projection distance over a wide range are suppressed. It is desirable for the second focus lens group to include a second temperature correcting lens group that moves when focusing is carried out in response to changes in the peripheral temperature of the projection optical system.

It is desirable for the first reflective surface to not move when focusing is carried out in response to changes in the optical distance between the first reflective surface and the second image plane. By not moving the first reflective surface in response to changes in the projection distance, it is possible to carry out focusing without changing the optical distance between the first image plane and the first reflective surface. This means that it is possible to reduce the influence (tolerance sensitivity) that the mounting tolerance of the first reflective surface has on the image formation performance for the projected images.

It is desirable for the first refractive optical system to include a negative lens of meniscus type (negative meniscus lens) whose convex surface is oriented toward the enlargement side, and for the second refractive optical system to include a positive lens of meniscus type (positive meniscus lens) that is positioned closest to a reducing side of the second refractive optical system and whose convex surface is oriented toward the reducing side. By sandwiching the first intermediate image between a convex surface of the negative lens positioned on the reducing side of the first intermediate image and a convex surface of the positive lens positioned on the enlargement side of the first intermediate image, it is possible to suppress the generation of coma aberration and spherical aberration. It is desirable for the negative lens to be position closest to the enlargement side of the first refractive optical system. It is easy to separate image flux for each image angle in the vicinity of the image formation position of the first intermediate image. In addition, by making the convex surface of the negative lens and the convex surface of the positive lens aspherical, it is possible to also effectively correct off-axis aberration including curvature of field, astigmatism, distortion and the like.

In this projection optical system, it is desirable for a Petzval sum PTZ1 of the first refractive optical system, a third-order aberration coefficient DST1 of distortion of the first refractive optical system, a third-order aberration coefficient TCO1 of coma aberration of the first refractive optical system, a Petzval sum PTZ2 of the second refractive optical system, a third-order aberration coefficient DST2 of distortion of the second refractive optical system, and a third-order aberration coefficient TCO2 of coma aberration of the second refractive optical system to satisfy Conditions (1) to (3) below.

$$|PTZ1|<|PTZ2| \quad (1)$$

$$|DST1|<|DST2| \quad (2)$$

$$-0.5<|TCO1|-|TCO2|<0.5 \quad (3)$$

In this projection optical system, according to Condition (1), the second refractive optical system has a larger correction effect for curvature of field than the first refractive optical system, according to Condition (2), the second refractive optical system has a larger correction effect for distortion than the first refractive optical system, and according to Condition (3), the correction effect for coma aberration is substantially equal for the first refractive optical system and the second refractive optical system. This means that it is possible to reduce the correction load of the second refractive optical system. Accordingly, it is possible to simplify the configuration of the second refractive optical system and to make the second refractive optical system compact.

In addition, it is desirable for a curvature of field FC1 of the first intermediate image and a curvature of field FC2 of the second intermediate image to satisfy Conditions (4) and (5) below.

$$0<FC1 \times FC2 \quad (4)$$

$$0.03<|FC1| \quad (5)$$

In this projection optical system, it is desirable for principal ray emitted from the first intermediate image to be oriented toward an optical axis of the second refractive optical system.

Another aspect of the present invention is a projector apparatus including: the projection optical system described above; and a light modulator that forms an image at the first image plane.

Yet another aspect of the present invention is a projector system including: a projection optical system that projects from a first image plane on a reducing side to a second image plane on an enlargement side; and a focusing mechanism that carries out focusing of the projection optical system. The projection optical system of the projector system includes: a first refractive optical system that forms a first intermediate image on the enlargement side using light incident from the reducing side; a second refractive optical system that forms the first image on the reducing side into a second intermediate image on the enlargement side; and a first reflective optical system including a first reflective surface with positive refractive power that is positioned on the enlargement side of the second intermediate image, and the focusing mechanism includes a mechanism that moves at least one lens included in the second refractive optical system.

Yet another aspect of the present invention is a method of carrying out focusing of a projection optical system that projects from a first image plane on a reducing side to a second image plane on an enlargement side. The projection optical system includes: a first refractive optical system that forms a first intermediate image on the enlargement side using light incident from the reducing side; a second refractive optical system that forms the first image on the reducing side into a second intermediate image on the enlargement side; and a first reflective optical system including a first reflective surface with positive refractive power that is positioned on the enlargement side of the second intermediate image, and the method includes moving at least one lens included in the second refractive optical system.

BRIEF DESCRIPTION OF THE DRAWINGS

FIG. 4 is a diagram showing lens data of the projection optical system according to the first embodiment.

FIG. 5 is a diagram showing various values of the projection optical system according to the first embodiment, with (a) showing the distances between lenses at the first and the second projection positions, (b) showing fundamental data, and (c) showing aspherical surface data.

FIG. 12 is a diagram showing lens data of the projection optical system according to the second embodiment.

FIG. 13 is a diagram showing various values of the projection optical system according to the second embodiment, with (a) showing the distances between lenses at the first and the second projection positions, (b) showing fundamental data, and (c) showing aspherical surface data.

DETAIL DESCRIPTION

Figure 1:
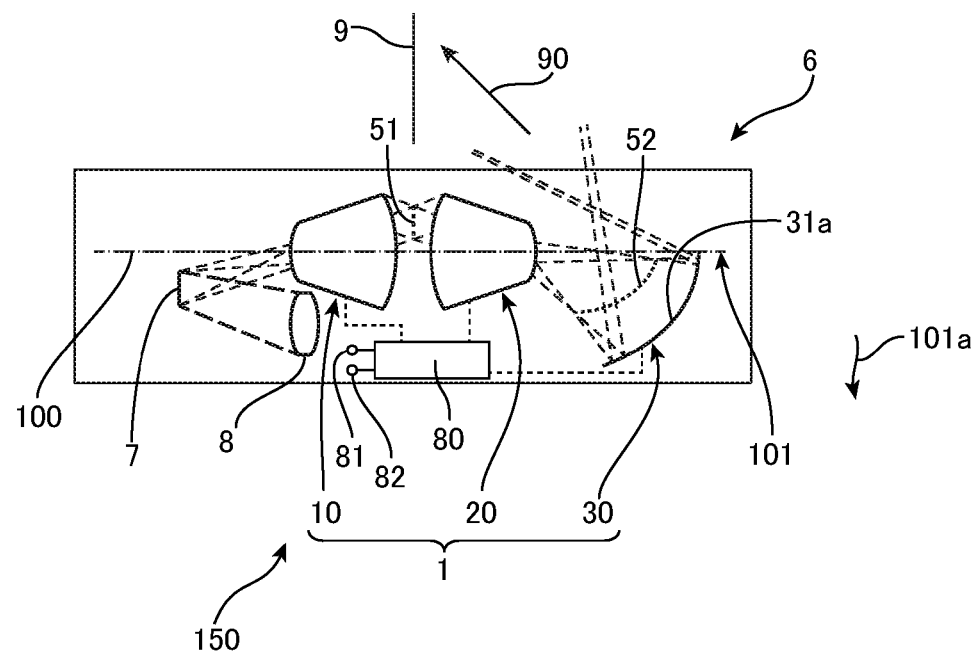
FIG. 1 is a diagram showing the overall configuration of a projector apparatus that uses a projection optical system according to the present invention.

FIG. 1 shows the overall configuration of a projector apparatus that uses a projection optical system according to the present invention. A projector (projector apparatus) 6 includes a light modulator (light valve) 7, an illumination optical system 8 that illuminates the light valve 7 with illumination light to be modulated, and a projection system 150 that projects an image formed by the light valve 7 onto a screen 9. The projection system 150 includes a projection optical system 1 that enlarges and projects the images formed by the light valve 7 whose image plane is a first image plane on the reducing side, by the projecting light 90 onto a screen 9 that is a second image plane on the enlargement side, and a focusing mechanism (focusing unit) 80 that carries out focusing of the projection optical system 1.

The light valve 7 may be a device capable of forming an image such as an LCD (liquid crystal display panel), a digital mirror device (DMD) or an organic EL display, and may be a single panel-type device or a device that uses a method where images of different colors are individually formed. Note that the light valve 7 may be a reflective LCD or a transmissive LCD, and if the light valve 7 is a transmissive-type, the illumination optical system 8 is disposed on the opposite side of the light valve 7 in the direction of a first optical axis 100 of the projection optical system 1. A typical light valve 7 is a single panel-type video projector that uses a DMD, and the illumination optical system 8 includes a white light source, such as a halogen lamp, and a rotating color splitting filter (color wheel) in the form of a disc, with the DMD 7 forming images in the three colors red, green, and blue according to time division. Note that in FIG. 1, the DMD 7 shows the first plane set on the DMD. The screen 9 may be a wall surface, a white board, or the like, the projector 6 may be a front projector, or a rear projector that includes a screen.

The projection optical system 1 projects from the DMD 7 that is a first image plane on the reducing side onto the screen 9 that is the second image plane on the enlargement side. The projection optical system 1 includes a first refractive optical system 10 that includes a plurality of lenses and forms a first intermediate image 51 on the enlargement side using light that is incident from the reducing side, a second refractive optical system 20 that includes a plurality of lenses and forms the first intermediate image 51 on the reducing side into a second intermediate image 52 on the enlargement side, and a first reflective optical system 30 that includes a first reflective surface 31a that has positive refractive power and is positioned on the enlargement side of the second intermediate image 52.

The focusing unit 80 that carries out focusing of the projection optical system 1 includes a distance detecting unit 81 that detects the optical distance (projecting distance) between the first reflective surface 31a and the screen 9 and a temperature detection unit 82 that detects the peripheral temperature of the projection optical system 1. The focusing unit 80 may include a first mechanism that moves at least one lens and/or reflective surface included in the first refractive optical system 10, the second refractive optical system 20, and the first reflective optical system 30, in response to changes in the projecting distance detected by the distance detecting unit 81. The focusing unit 80 may also include a second mechanism that moves at least one lens and/or reflective surface included in the first refractive optical system 10, the second refractive optical system 20, and the first reflective optical system 30 in response to changes in the peripheral temperature detected by the temperature detection unit 82.

In this projection optical system 1, the first intermediate image 51, the second intermediate image 52, and the image formed by the first reflective surface 31a are respectively formed on opposite sides of the optical axis 100 that is common to the first refractive optical system 10 and the second refractive optical system 20. That is, the projection optical system 1 is designed so that light ray (principal ray) 90 that connects the center of the screen 9 and the center of the DMD 7 crosses the optical axis 100 three times. The light rays 90 crosses the optical axis 100 twice between the DMD 7 and the first reflective surface 31a. That is, the DMD 7 and the first reflective surface 31a can be disposed in the same direction with respect to the optical axis 100, that is, the same direction (a first direction 101a (the downward direction in FIG. 1)) with respect to a first plane 101 that includes the optical axis 100. Both of the illumination optical system 8 that illuminates the DMD 7 and the first reflective surface 31a can dispose the first direction (downward) 101a to the first plane 101 and commonly utilize a space to the first plane 101. Accordingly, the height (thickness) of the projector 6 including the projection optical system 1 and the illumination optical system 8 can be reduced.

Figure 2:
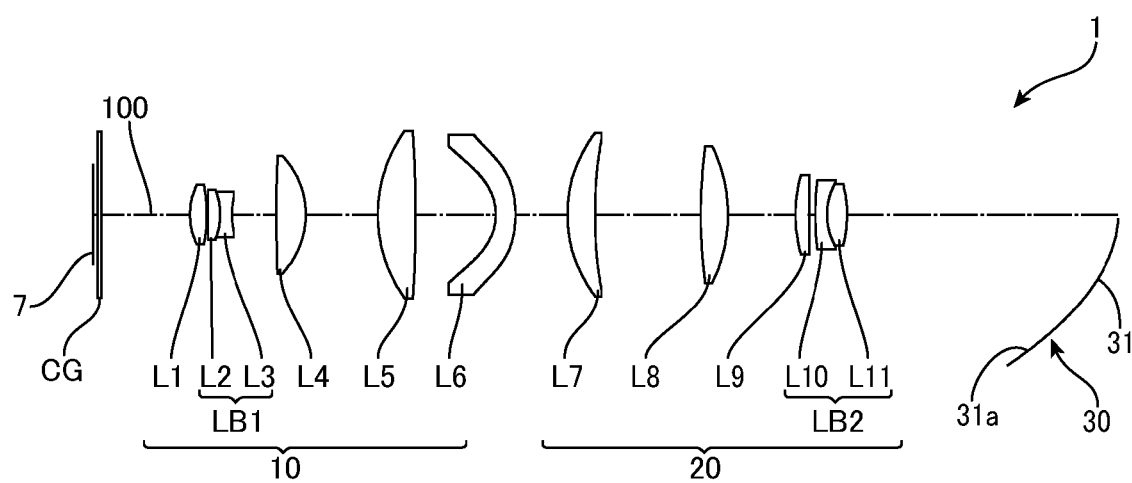
FIG. 2 is a diagram showing the overall configuration of the projection optical system according to a first embodiment.
Figure 3:
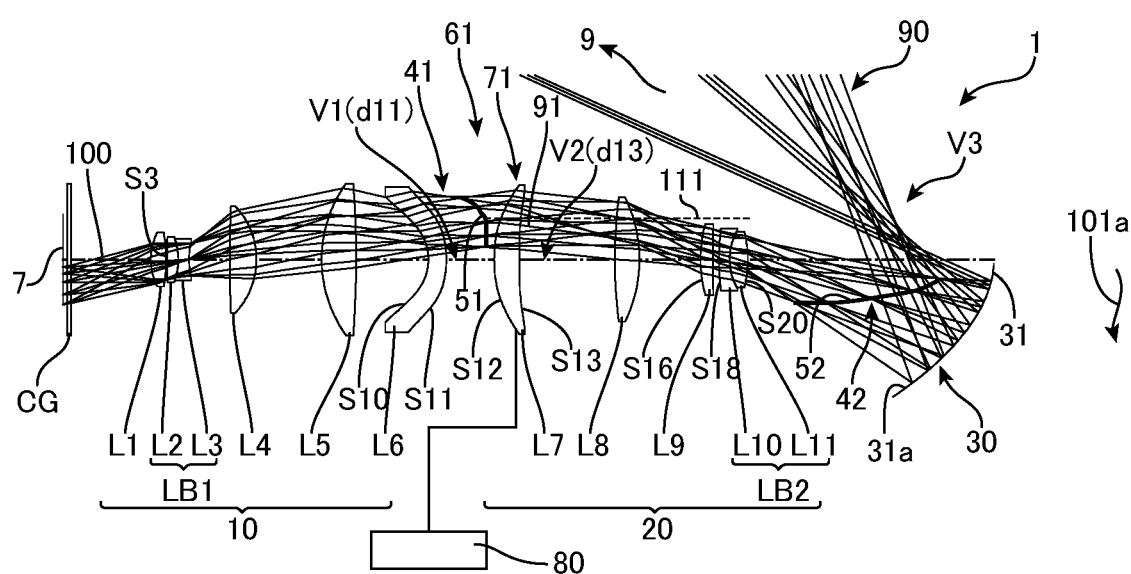
FIG. 3 is a light ray diagram of the projection optical system according to the first embodiment.

FIG. 2 shows the projection optical system 1 according to a first embodiment. FIG. 3 shows a light ray diagram of the projection optical system 1. This projection optical system 1 is a fixed focus (single focus)-type projection optical system that is non-telecentric on the incident (reducing) side and does not carry out zooming. The projection optical system 1 includes, in order from the side of the DMD 7 on the reducing side, the first refractive optical system 10 that includes six lenses L1 to L6, the second refractive optical system 20 that includes five lenses L7 to L11, and the first reflective optical system 30 that includes a single mirror (concave mirror) 31 equipped with the first reflective surface 31a. In the projection optical system 1, the image formed on the light valve 7 that is the first image plane is enlarged and projected by the first refractive optical system 10, the second refractive optical system 20, and the first reflective optical system 30 onto the screen 9 that is the second image plane. Note that the first refractive mirror (mirror surface) for bending the optical axis 100 at an appropriate position or positions.

The first refractive optical system 10 is a lens system that as a whole has positive refractive power and is composed of a positive lens L1 that is biconvex, a cemented lens (balsam lens, doublet) LB1 where two lenses are stuck together, a positive lens L4 that is biconvex, a positive lens L5 that is biconvex, and a negative meniscus lens L6 whose convex surface S11 is oriented toward the enlargement side, disposed in that order from the DMD 7 side. The cemented lens LB1 is composed of a positive lens L2 that is biconvex and a negative lens L3 that is biconcave disposed in that order from the DMD 7 side. The convex surface S3 on the DMD 7 side (reducing side) of the positive lens L2 is an aspherical surface. In addition, both surfaces of the negative lens L6, that is, the concave surface S10 on the DMD 7 side and the convex surface S11 on the mirror 31 side (enlargement side), are aspherical surfaces. The DMD 7 is disposed on the reducing side of the first refractive optical system 10 with a cover glass CG in between. The first refractive optical system 10 forms an image on the light valve 7, which is the first image plane, into the first intermediate image 51 in a space 41 between the first refractive optical system 10 and the second refractive optical system 20.

The second refractive optical system 20 is a lens system that as a whole has positive refractive power and is composed of a positive meniscus lens L7 whose convex surface S12 is oriented toward the reducing side, a positive lens L8 that is biconvex, a positive meniscus lens L9 whose convex surface S16 is oriented toward the reducing side, and a cemented lens LB2 where two lenses are stuck together, disposed in that order from the DMD 7 side. The cemented lens LB2 is composed of a negative meniscus lens L10 whose convex surface S18 is oriented toward the reducing side and a positive lens L11 that is biconvex. Both surfaces of the positive lens L7, that is, the convex surface S12 on the DMD 7 side and the concave surface S13 on the mirror 31 side, are aspherical surfaces. The second refractive optical system 20 forms the first intermediate image 51 as the second intermediate image 52 in a space 42 between the second refractive optical system 20 and the first reflective surface 31a.

The first reflective optical system 30 is a mirror system that as a whole has positive refractive power and is composed of the mirror (concave mirror) 31 that has the first reflective surface (mirror surface) 31a. The first reflective surface 31a of the mirror 31 is an aspherical surface. By projecting the second intermediate image 52 onto the screen 9 that is the second image plane, the first reflective optical system 30 enlarges and projects the image on the DMD 7 onto the screen 9. Note that although lens surfaces and mirror surfaces (reflective surfaces) included in the projection optical system 1 are spherical or aspherical surfaces with rotational symmetry, such surfaces may be surfaces that do not exhibit rotational symmetry, for example, free-formed curved surfaces. This also applies to the embodiments described below.

In this projection optical system 1, the first intermediate image 51 and the second intermediate image 52 are formed (inverted) on opposite sides of the optical axis 100. This means that light flux that reaches the second intermediate image 52 from the first intermediate image 51 becomes concentrated in the periphery of the optical axis 100 as the light propagates toward the enlargement side. Accordingly, it is possible to reduce the lens diameters on the enlargement side of the second refractive optical system 20 relative to the lens diameters on the reducing side. This means that it is possible to make the second refractive optical system 20 compact. In addition, since it is possible to make the lens diameters on the enlargement side of the second refractive optical system 20 smaller, it is possible to suppress interference between the second refractive optical system 20 and light flux (projecting light) reflected by the first reflective surface 31a. This means that it is easy to reduce the optical distance (distance in air, air gap) between the second refractive optical system 20 and the first reflective surface 31a and to make the first reflective surface 31a smaller.

In the projection optical system 1, it is preferable for the second lens from the enlargement side of the second refractive optical system 20 to have positive refractive power. In addition, it is desirable for the third lens from the enlargement side of the second refractive optical system 20 to have positive refractive power. In addition, it is much more desirable for the lens closest to the enlargement side (the final lens) of the second refractive optical system 20 to be a cemented lens where convex surfaces are oriented toward both sides. The projection optical system 1 in the present embodiment satisfies all of the conditions described above, the positive lens L9 and the positive lens L8 with positive refractive power are disposed as the second and third lenses from the enlargement side of the second refractive optical system 20, and a cemented lens LB2 with the convex surfaces S18 and S20 oriented toward both sides is disposed as the final lens on the enlargement side of the second refractive optical system 20. By this arrangement where a lens with negative refractive power is not disposed immediately before the final lens, the light flux that reaches the second intermediate image 52 converges effectively. Accordingly, it is possible to significantly reduce the lens diameter on the enlargement side of the second refractive optical system 20. This means that it is possible to suppress interference between the second refractive optical system 20 and the light flux reflected by the first reflective surface 31a and it is not necessary to cut the lenses on the enlargement side of the second refractive optical system 20. Accordingly, it is desirable for the second refractive optical system 20 to be entirely composed of lenses with positive refractive power, including or except for the final lens. It is easy to concentrate light flux that reaches the second intermediate image 52 from the first intermediate image 51 in the periphery of the optical axis 100 and possible to emit projecting light that is closer to the optical axis 100 from the first reflective surface 31a. Accordingly, it is possible to make effective use up a region close to the optical axis 100 of the first reflective surface 31a and to enlarge and project a wide-angle image onto the screen 9 with a large angle of view and a low angle of elevation relative to the optical axis 100.

In the projection optical system 1, the first refractive optical system 10 forms the first intermediate image 51, the second refractive optical system 20 forms such first intermediate image 51 into the second intermediate image 52 on the enlargement side, and the first reflective surface 31a reflects and enlarges the second intermediate image 52. The second intermediate image 52 is reflected and enlarged at the first reflective surface 31a, and it is possible to make the image on the DMD 7 extremely wide angle, but the light ray paths that reach the screen 9 from the second intermediate image 52 drastically change, so a large amount of distortion and curvature of field occur. It is not so easy to produce a design where various aberrations such as distortion and curvature of field (keystone distortion) are corrected at the first reflective surface 31a. Accordingly, in the projection optical system 1, the first reflective surface 31a is assumed to have distortion and curvature of field and the second refractive optical system 20 forms the second intermediate image 52 in which distortion and curvature of field, out of the aberrations produced by the first reflective surface 31a, are mainly corrected. In addition, the first refractive optical system 10 forms the first intermediate image 51 in which coma aberration to be produced by correction stage of the second refractive optical system 20 and the distortion and curvature of field remaining after correction by the second refractive optical system 20 are pre-corrected. This means that it is possible to provide the projection optical system 1 that is capable of projecting sharp and extremely wide-angle images onto the screen 9.

The second refractive optical system 20 of the projection optical system 1 includes a first focus lens group 61 that moves when focusing (adjusting focus) in response to a change in the environment of projection, such as the projecting distance, peripheral temperature, and peripheral humidity. The first focus lens group 61 according to the present embodiment includes a distance correcting lens group (first distance correcting lens group) 71 that moves when carrying out focusing in response to changes in the optical distance (projecting distance) V3 between the first reflective surface 31a and the screen 9. The distance correcting lens group 71 is composed of the first lens (positive lens) L7 positioned closest to the reducing side out of the five lenses L7 to L11 included in the second refractive optical system 20.

This projection optical system 1 is a pan focus-type optical system that is ultra-wide angle, whose focal length is extremely short, and has a large depth of field on the first image plane side. This means that the range where the projected image does not appear blurred when the distance between the projection optical system 1 and the screen 9 has changed, or in other words, the depth of focus on the second image plane side is also large. Accordingly, although it is easy for fluctuations in focus near the center of the projected images that accompany changes in the projection distance V3 to be absorbed in the depth of field, there is also a tendency for fluctuations in aberration (fluctuations in the image plane) to increase in the periphery of the projected images. In this projection optical system 1, the first lens L7 that is the distance correcting lens group 71 is moved when focusing is carried out. That is, the first refractive optical system 10 and the first reflective surface 31a do not move and the first lens L7 of the second refractive optical system 20 moves in the direction of the optical axis 100 between the first intermediate image 51 on the reducing side and the second intermediate image 52 on the enlargement side. It is possible to carry out focusing without changing the optical distance between the first intermediate image 51 and the first reflective surface 31a. Accordingly, it is possible to prevent fluctuations in the image formation position and image formation performance for the first intermediate image 51. This means that by moving the first lens L7, it is easy to form a second intermediate image 52 where fluctuations in distortion and curvature of field that accompany changes in the projection distance V3 are corrected. Accordingly, it is possible to project, sharp, ultra-wide angle images in which fluctuations in aberration that accompany changes in the projection distance V3 are corrected. In addition, both surfaces of the first lens L7, that is, the convex surface S12 and the concave surface S13, are aspherical surfaces. It is possible to correct aberrations that may fluctuate accompany changes in the projection distance V3 much more effectively.

The first lens L7 is also the lens that is closest to the first intermediate image 51 out of the second refractive optical system 20. The projection light 90 disperses in the periphery of the image formation position of the first intermediate image 51, that is, on the enlargement side of the first intermediate image 51, which makes it easy to separate the light flux for each image angle. In addition, the first intermediate image 51 is formed so as to be substantially perpendicular to the optical axis 100 so that the image plane becomes slightly tilted to the reducing side as the distance from the optical axis 100 increases. This means that the light rays 90 in the periphery of the first intermediate image 51 are dispersed so that the light flux is not concentrated in a state that is close to telecentric. Accordingly, by disposing the first lens L7 that carries out focusing at a position that is closest to the first intermediate image 51, it is possible to carry out fine adjustment of focus without suddenly changing the ray paths when carrying out focusing and suppressing fluctuations in aberration that accompany focusing and also suppressing lateral magnification (image magnification). It is possible to project sharp enlarged images in which focus fluctuations that accompany changes in the projection distance V3 are more thoroughly suppressed.

The focusing unit 80 according to the present embodiment includes a first mechanism that moves the first lens L7 included in the second refractive optical system 20 in response to changes in the projection distance V3 detected by the distance detecting unit 81. When there is a change in the projection distance V3 from a first projection position P1 (where the projecting distance V3=−550 mm) to a second projection position P2 (where the projecting distance V3=−700 mm), focusing is carried out by the first mechanism moving the first lens L7 by around 0.64 mm from the reducing side toward the enlargement side, that is from the first intermediate image 51 side toward the second intermediate image 52 side.

In addition, the first reflective surface 31a does not move when focusing is carried out in response to changes in the projection distance V3. If the mirror 31 were moved when focusing is carried out, it would be easy for eccentricity to occur and for the image forming performance to become unbalanced between the near point and the far point. In the projection optical system 1, by fixing the mirror 31 and moving the first lens L7 in response to changes in the projection distance V3, focusing can be completed within the second refractive optical system 20. This means that it is possible to reduce the influence that the mounting tolerance (error) of the mirror 31 has on the image formation performance for the projected images.

Note that in addition to the distance correcting lens group 71, the first focus lens group 61 may include a distance correcting lens group that moves when carrying out focusing in response to changes in the projection distance V3, and it is preferable for such distance correcting lens group to be composed of four lenses L8 to L11. It is possible to correct fluctuations in curvature of field that accompany changes in the projection distance V3 even more favorably. The respective distance correcting lens groups may move independently or in concert.

Also, the first focus lens group 61 may include a temperature correcting lens group (first temperature correcting lens group) that moves when carrying out focusing in response to changes in the peripheral temperature of the projection optical system 1, and it is preferable for such temperature correcting lens group to be composed of the five lenses L7 to L11. It is possible to project sharp enlarged images in which fluctuations in focus (fluctuations in back focus) due to changes in the refractive indices of lenses that accompany changes in the temperature of the periphery in which the projection optical system 1 is set up are corrected.

The first refractive optical system 10 may also include a second focus lens group that moves when focusing is carried out in response to changes in the projection environment. The second focus lens group may include a number of distance correcting lens groups (second distance correcting lens groups) that move when focusing is carried out in response to changes in the projection distance V3, and such number of distance correcting lens groups include groups composed of the four lenses L1 to L4 and groups composed of the two lenses L5 and L6. In addition, the second focus lens group may include a temperature correcting lens group (second temperature correcting lens group) that moves when focusing is carried out in response to changes in peripheral temperature and it is preferable for such temperature correcting lens group to be composed of the four lenses L1 to L4. That is, the four lenses L1 to L4 that move as the distance correcting lens group may move as a temperature correcting lens group. The respective temperature correcting lens groups may move independently or in concert.

In the projection optical system 1, it is easy to separate the light flux for each image angle before and after the image formation position of the first intermediate image 51, that is on the reducing side and the enlargement side of the first intermediate image 51. In the projection optical system 1, the negative lens L6 that is aspherical on both surfaces is disposed on the reducing side of the first intermediate image 51 with only an air gap in between, and the first lens L7 that is aspherical on both surfaces is disposed on the enlargement side of the first intermediate image 51 with only an air gap in between. The first intermediate image 51 is sandwiched by the convex surface S11 and the convex surface S12 that are both aspherical. Accordingly, it is possible to suppress the occurrence of spherical aberration and coma aberration and to also effectively correct off-axis aberrations such as curvature of field, astigmatism, and distortion. In addition, the DMD 7 and the first reflective surface 31a are disposed in the first direction 101a (i.e., the same direction) with respect to the optical axis 100, and the principal ray 91 from the DMD 7 is bent toward the first reflective surface 31a via the first intermediate image 51. This means that it is easy for the lens diameters of the positive lens L6 and the first lens L7 before and after the first intermediate image 51 to increase. Accordingly, by making the negative lens L6 and the positive lens L7 out of resin, it is possible to effectively correct various aberrations and to reduce cost.

It is possible to design the projection optical system 1 so that the Petzval sum (third-order aberration coefficient of curvature of field) PTZ1, the third-order aberration coefficient DST1 of distortion, and the third-order aberration coefficient TCO1 of coma aberration of the first refractive optical system 10, and the Petzval sum PTZ2, the third-order aberration coefficient DST2 of distortion, and the third-order aberration coefficient TCO2 of coma aberration of the second refractive optical system 20 satisfy the following Conditions (1) to (3).

$$|PTZ1|<|PTZ2| \tag{1}$$

$$|DST1|<|DST2| \tag{2}$$

$$-0.5<|TCO1|-|TCO2|0.5 \tag{3}$$

In the projection optical system 1, according to Condition (1) the second refractive optical system 20 has a larger correction effect for curvature of field than the first refractive optical system 10, according to Condition (2) the second refractive optical system 20 has a larger correction effect for distortion than the first refractive optical system 10, and according to Condition (3), the correction effect for coma aberration is substantially equal for the first refractive optical system 10 and the second refractive optical system 20. That is, by correcting the majority of the curvature of field and distortion generated by the first reflective surface 31a using the second refractive optical system 20 and correcting the curvature of field and distortion remaining after correction by the second refractive optical system 20 using the first refractive optical system 10, the correction load of the second refractive optical system 20 is reduced. Accordingly, it is possible to simplify the configuration of the second refractive optical system 20 and to make the second refractive optical system 20 compact. As the upper limit of Condition (3), 0.25 is desirable and 0.1 is even more desirable. In addition, as the lower limit of Condition (3), −0.25 is desirable and −0.1 is even more desirable. Coma aberration is cancelled out between the first refractive optical system 10 and the second refractive optical system 20.

This projection optical system 1 can also be designed so that the curvature of field (a value of the curvature of field) FC1 of the first intermediate image 51 and the curvature of field (a value of the curvature of field) FC2 of the second intermediate image 52 satisfy Conditions (4) and (5) below.

$$0<FC1\times FC2 \tag{4}$$

$$0.03<|FC1| \tag{5}$$

In the projection optical system 1, according to Condition (4), the orientations (signs, plus and minus) of the curvature of field of the first intermediate image 51 and the second intermediate image 52 are the same and according to Condition (5), the curvature of field CF1 of the first intermediate image 51 is larger than a predetermined amount and the curvature of field remaining after correction by the second refractive optical system 20 is corrected by the first refractive optical system 10. In the present embodiment, according to the first refractive optical system 10 and the second refractive optical system 20, the first intermediate image 51 and the second intermediate image 52 are respectively formed so that a concave image plane is oriented toward the reducing side (i.e., the image planes are convex on the enlargement side). Alternatively, the first intermediate image 51 and the second intermediate image 52 may be formed so that a convex image plane is oriented toward the reducing side (i.e., the image planes are concave on the enlargement side).

In addition, the first refractive optical system 10 forms an image so that the image plane of the first intermediate image 51 is inclined so as to be tilted toward the reducing side as the distance from the optical axis 100 increases. This means that it is possible to use a design where the principal ray 91 emitted from the first intermediate image 51 towards the optical axis 100, that is, are more downwardly tilted than a telecentric design toward the enlargement side. That is, it is possible to use a design where the ray angle ANG1 of the principal ray 91 emitted from the first intermediate image 51 satisfy Condition (6) below.

$$ANG1<0 \quad (6)$$

It is possible to design the projection optical system 1 so that according to Condition (6), the ray angle ANG1 of the principal ray 91 of the first intermediate image 51 becomes negative in a case where the direction of dispersion (divergence) is positive, or in other words becomes an angle of depression relative to the first axis 111 that is parallel to the optical axis 100. This means that it is not necessary to raise the power of the second refractive optical system 20. It is also possible to reduce the lens diameter of the second refractive optical system 20.

FIG. 4 shows lens data of the projection optical system 1. FIG. 5 shows various numeric values of the projection optical system 1. In the lens data, "Ri" represents the radius of curvature (mm) of each lens (i.e., each lens surface) disposed in order from the DMD (light valve) 7 side, "di" represents the distance (mm) between the respective lens surfaces disposed in order from the DMD 7 side, "nd" represents the refractive index (d line) of each lens disposed in order from the DMD 7 side, and "vd" represents the Abbe number (d line) of each lens disposed in order from the DMD 7 side. In FIG. 4, "Flat" indicates a flat surface. In FIG. 5(c), "En" represents "10 to the power n" and as one example, "E-05" represents "10 to the power −5". The same also applies to the following embodiments.

As shown in FIG. 5(a), the spatial distance (optical distance, projecting distance) V3 between the first reflective surface 31a and the screen 9 is "−550 mm" at the first projection position P1 and "−700 mm" at the second projection position P2. In the projection optical system 1, when the projection distance V3 has changed between the first projection position P1 and the second projection position P2, focusing is carried out by changing the distance in air gap V1 (d11) between the negative lens L6 and the positive lens L7 and the distance in air V2 (d13) between the positive lens L7 and the positive lens L8.

The convex surface S3 of the positive lens L2, the concave surface S10 and convex surface S11 of the negative lens L6, and the convex surface S12 and the concave surface S13 of the positive lens L7 and the first reflective surface 31a of the mirror 31 are aspherical surfaces. The aspherical surfaces are expressed by the following expression using the coefficients K, A3, A4, A6, A8, A10, A12, and A14 shown in FIG. 5(c) with the direction X as the coordinate in the optical axis 100, the direction Y as the coordinate in a direction perpendicular to the optical axis 100, the direction in which light propagates as positive, and R as the paraxial radius of curvature. This is also the case for the embodiments described later.

$$X=(1/R)Y^2/[1+\{1-(1+K)(1/R)^2Y^2\}^{1/2}]+A3Y^3+A4Y^4+A6Y^6+A8Y^8+A10Y^{10}+A12Y^{12}+A14Y^{14}$$

Figure 6:
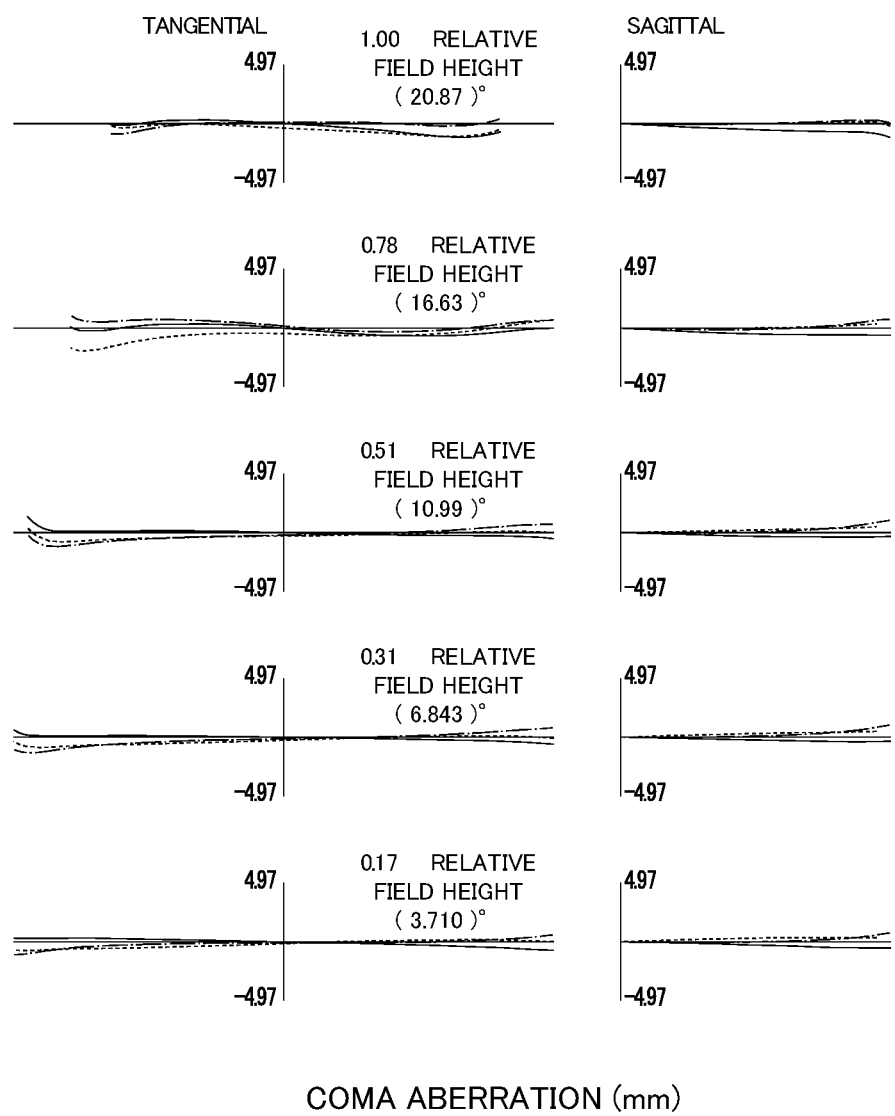
FIG. 6 is a coma aberration graph at the first projection position of the projection optical system according to the first embodiment.
Figure 7:
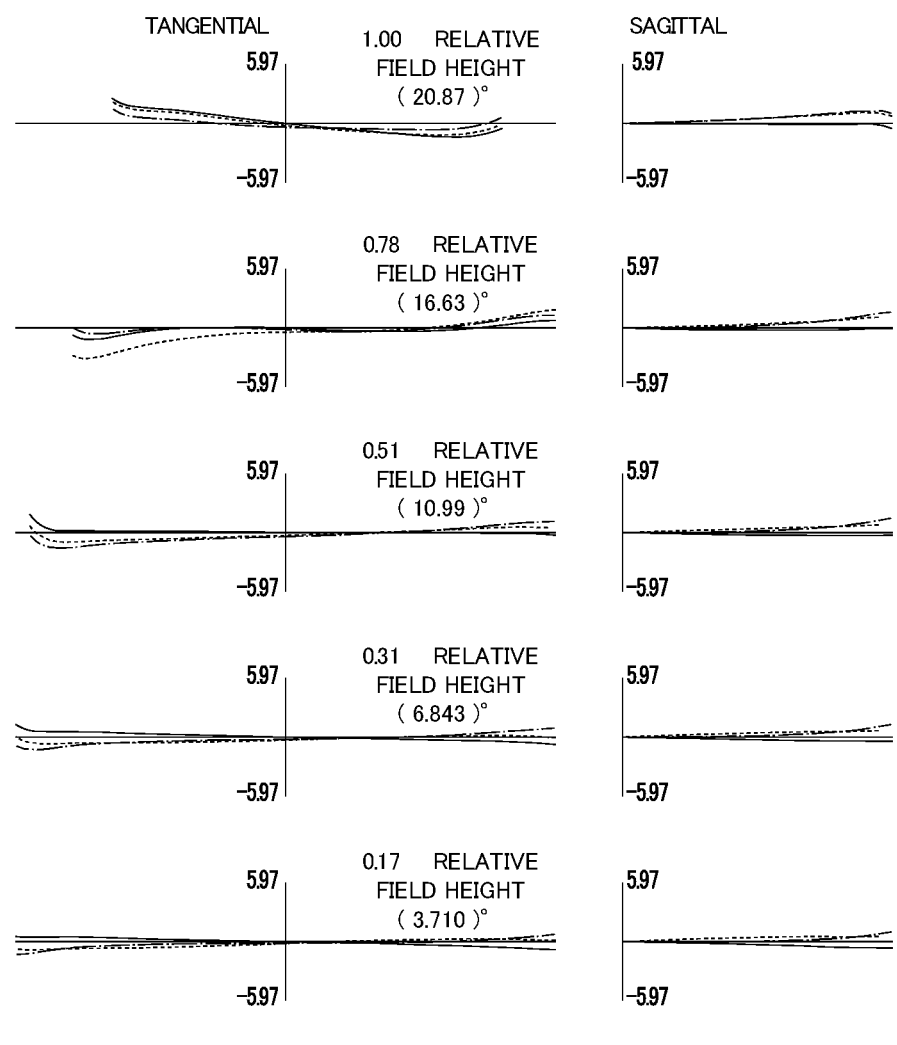
FIG. 7 is a coma aberration graph at the second projection position of the projection optical system according to the first embodiment.
Figure 8:
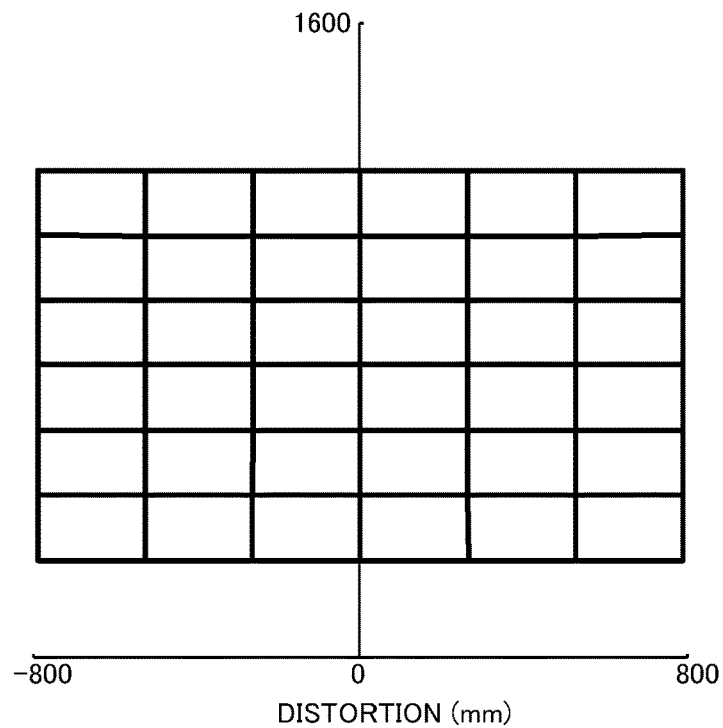
FIG. 8 is a distortion graph at the first projection position of the projection optical system according to the first embodiment.
Figure 9:
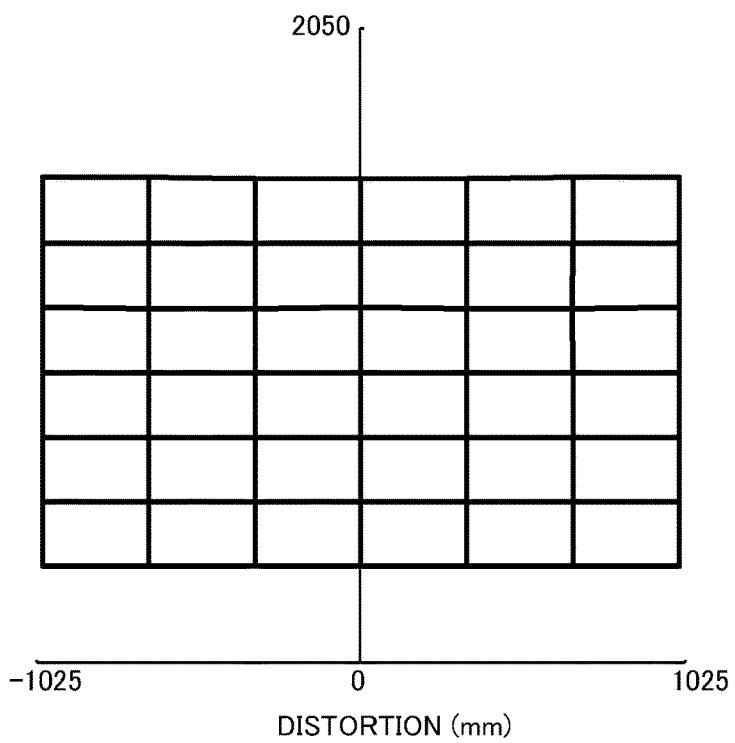
FIG. 9 is a distortion graph at the second projection position of the projection optical system according to the first embodiment.

FIG. 6 shows a coma aberration graph at the first projection position P1 of the projection optical system 1. FIG. 7 shows a coma aberration graph at the second projection position P2 of the projection optical system 1. FIG. 8 shows a distortion graph at the first projection position P1 of the projection optical system 1. FIG. 9 shows a distortion graph at the second projection position P2 of the projection optical system 1. As shown in FIGS. 6 to 9, all of the aberrations are favorably corrected and it is possible to project sharp enlarged images. Note that coma aberration is shown for a wavelength of 620 nm (dotted line), a wavelength of 550 nm (solid line), and a wavelength of 460 nm (dot-dash line).

Figure 10:
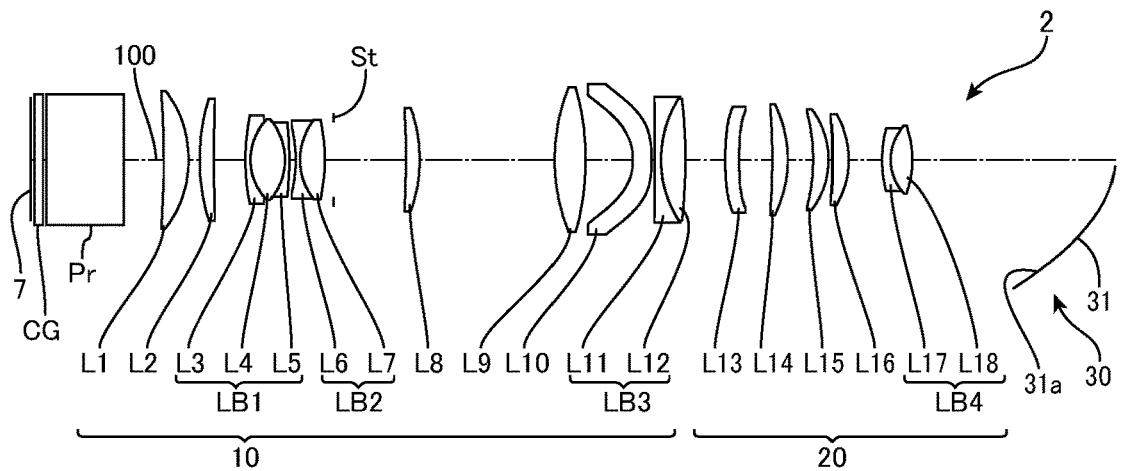
FIG. 10 is a diagram showing the overall configuration of a projection optical system according to a second embodiment.
Figure 11:
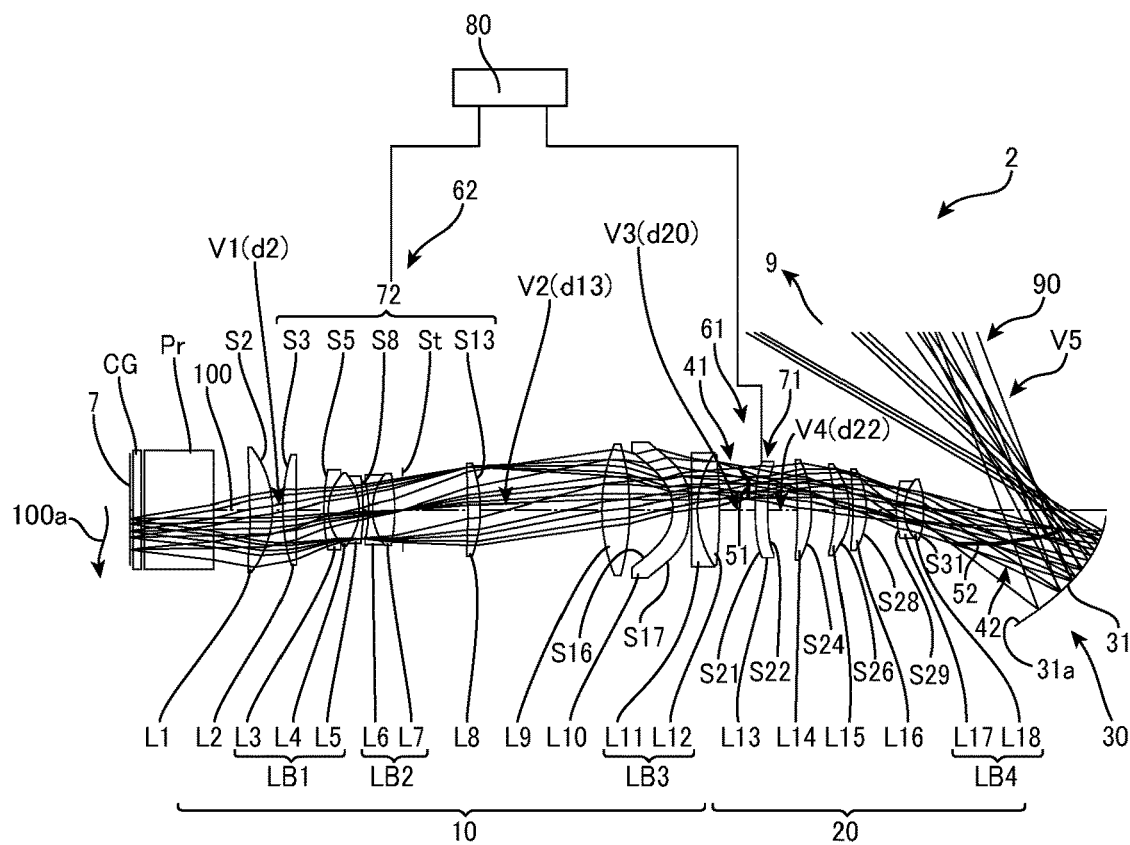
FIG. 11 is a light ray diagram of the projection optical system according to the second embodiment.

FIG. 10 shows a projection optical system 2 according to a second embodiment. FIG. 11 is a ray diagram of the projection optical system 2. The projection optical system 2 is a fixed focus (single focus)-type projection optical system that is telecentric on the incident side (reducing side) and does not carrying out zooming. The projection optical system 2 includes the first refractive optical system 10 that includes twelve lenses L1 to L12, the second refractive optical system 20 that includes six lenses L13 to L18, and the first reflective optical system 30 that includes a single mirror (concave mirror) 31 with the first reflective surface 31a, disposed in that order from the DMD 7 side on the reducing side. In the projection optical system 2 also, images formed on the DMD 7 that is the first image plane are enlarged and projected onto the screen 9 that is the second image plane by the first refractive optical system 10, the second refractive optical system 20, and the first reflective optical system 30. Note that component elements that are the same as the embodiment described above have been assigned the same numerals and description thereof is omitted.

The first refractive optical system 10 is a lens system that as a whole has positive refractive power and is composed of a positive meniscus lens L1 whose convex surface S2 is oriented toward the enlargement side, a positive meniscus lens L2 whose convex surface S3 is oriented toward the reducing side, a cemented lens (balsam lens, triplet) LB1 where three lenses are stuck together, a cemented lens LB2 where two lenses are stuck together, a positive meniscus lens L8 whose convex surface S13 is oriented toward the enlargement side, a positive lens L9 that is biconvex, a negative meniscus lens L10 whose convex surface S17 is oriented toward the enlargement side, and a cemented lens LB3 where two lenses are stuck together, disposed in that order from the DMD 7 side. The cemented lens LB1 is composed of a negative meniscus lens L3 whose convex surface S5 is oriented toward the reducing side, a positive lens L4 that is biconvex, and a negative meniscus lens L5 whose convex surface S8 is oriented toward the enlargement side, disposed in that order from the DMD 7 side. The cemented lens LB2 is composed of a negative lens L6 that is biconcave and a positive lens L7 that is biconvex disposed in that order from the DMD 7 side. The cemented lens LB3 is composed of a negative lens L11 that is biconcave and a positive lens L12 that is biconvex disposed in that order from the DMD 7 side. The DMD 7 is disposed on the reducing side of the first refractive optical system 10 with a prism (TIR prism) Pr and the cover glass CG, which are disposed in that order from the enlargement side, in between. Both surfaces of the negative lens L10, that is, the concave surface S16 on the DMD 7 side and the convex surface S17 on the mirror 31 side, are aspherical surfaces. A stop St is disposed on the mirror 31 side of the cemented lens LB2, that is, in the space between the cemented lens LB2 and the positive lens L8.

The second refractive optical system 20 is a lens system that as a whole has positive refractive power and is composed of a positive meniscus lens L13 whose convex surface S21 is oriented toward the reducing side, a positive meniscus lens L14 whose convex surface S24 is oriented toward the enlargement side, a positive meniscus lens L15 whose convex surface S26 is oriented toward the enlargement side, a positive meniscus lens L16 whose convex surface S28 is oriented toward the enlargement side, and a cemented lens LB4 where two lenses are stuck together, disposed in that order from the DMD 7 side. The cemented lens LB4 is composed of a negative meniscus lens L17 whose convex surface S29 is oriented toward the reducing side and a positive lens L18 that is biconvex. Both surfaces of the positive lens L13, that is, the convex surface S21 on the DMD 7 side and the concave surface S22 on the mirror 31 side, are aspherical surfaces.

The second refractive optical system 20 of the projection optical system 2 includes a first focus lens group 61 that moves when carrying out focusing (focus adjustment) in response to changes in the environment conditions at the projection. The first focus lens group 61 in the present embodiment includes a distance correcting lens group (first distance correcting lens group) 71 that moves when carrying out focusing in response to changes in the optical distance (projecting distance) V5 between the first reflective surface 31a and the screen 9. The distance correcting lens group 71 is composed of a first lens (positive lens) L13 that is disposed closest to the reducing side out of the six lenses L13 to L18 included in the second refractive optical system 20.

In the projection optical system 2, the positive lens L16 and the positive lens L15 that have positive refractive power are disposed as the second and third lenses from the enlargement side of the second refractive optical system 20 and the cemented lens LB4 where convex surfaces S29 and S31 are oriented on both sides is disposed as the lens (final lens) that is closest to the enlargement side of the second refractive optical system 20. It is possible to cause the light flux that reaches the second intermediate image 52 to effectively converge without disposing a lens with negative refractive power immediately before the final lens. Accordingly, it is possible to significantly reduce the lens diameter on the enlargement side of the second refractive optical system 20. This means that it is possible to suppress interference between the second refractive optical system 20 and the light flux reflected by the first reflective surface 31a and it is not necessary to cut the lenses on the enlargement side of the second refractive optical system 20. Accordingly, it is desirable for the second refractive optical system 20 to be entirely composed of lenses with positive refractive power, including or except for the final lens.

In the projection optical system 2, when carrying out focusing, the first lens L13 that is the distance correcting lens group 71 and closest to the first intermediate image 51 out of the second refractive optical system 20 is moved. It is possible to carry out fine adjustment of focus while suppressing fluctuations in aberration that accompany focusing. It is possible to project sharp, enlarged images in which fluctuations in curvature of field that accompany changes in the projection distance V5 are corrected.

The focusing unit 80 according to the present embodiment includes a first mechanism that moves the first lens L13 included in the second refractive optical system 20 in response to changes in the projection distance V5 detected by the distance detecting unit 81. For this reason, when there is a change in the projection distance V5 from the first projection position P1 (where the projection distance V5=−469 mm) to the second projection position P2 (where the projection distance V5=−1449 mm), focusing is carried out by the first mechanism moving the first lens L13 by around 1.77 mm from the reducing side toward the enlargement side.

The first refractive optical system 10 of the projection optical system 2 includes a second focus lens group 62 that moves when carrying out focusing in response to changes in the projection environment. The second focus lens group 62 according to the present embodiment includes a distance correcting lens group (second distance correcting lens group) 72 that moves in response to changes in the projection distance V5. The distance correcting lens group 72 is composed of the seven lenses L2 to L8 included in the first refractive optical system 10.

In the projection optical system 2, when carrying out focusing, aside from the first lens L13 of the distance correcting lens group 71, the lenses L2 to L8 of the distance correcting lens group 72 are moved. That is, the lenses L2 to L8 move along the optical axis 100 between the DMD 7 on the reducing side and the first intermediate image 51 on the enlargement side. This means that by moving the lenses L2 to L8, it is possible to reduce the movement distance of the first lens L13. Accordingly, it is possible to suppress interference between the first lens L13 and the first intermediate image 51 and possible to carry out focusing while hardly moving the image formation position of the first intermediate image 51. This means that it is possible to project a sharp enlarged image where fluctuations in focus that accompany changes in the projection distance V5 over a wide range are suppressed.

The focusing unit 80 according to the present embodiment includes a first mechanism that moves the lenses L2 to L8 included in the first refractive optical system 10 in response to changes in the projecting distance V5 detected by the distance detecting unit 81. If the projection distance V5 changes from the first projection position P1 (where the projection distance V5=−469 mm) to the second projection position P2 (where the projection distance V5=−1449 mm), focusing is carried out by the first mechanism moving the lenses L2 to L8 by around 0.96 mm from the reducing side to the enlargement side.

Note that in addition to the distance correcting lens group 71, the first focus lens group 61 may include a distance correcting lens group that moves when focusing is carried out in response to changes in the projection distance V5 and it is preferable for such distance correcting lens group to be composed of the five lenses L14 to L18.

Also, the first focus lens group 61 may include a temperature correcting lens group (first temperature correcting lens group) that moves when focusing is carried out in response to changes in peripheral temperature of the projection optical system 2, and it is preferable for such temperature correcting lens group to be composed of the six lenses L13 to L18.

Also, in addition to the distance correcting lens group 72, the second focus lens group 62 may include a distance correcting lens group that moves when focusing is carried out in response to changes in the projecting distance V5 and it is preferable for such distance correcting lens group to be composed of the four lenses L9 to L12.

Also, the second focus lens group 62 may include a number of temperature correcting lens groups (second temperature correcting lens groups) that move when focusing is carried out in response to changes in peripheral temperature of the projection optical system 2, and such number of temperature correcting lens groups include a group composed of the single lens L1 and a group composed of the twelve lenses L1 to L12.

FIG. 12 shows lens data of the projection optical system 2. FIG. 13 shows various numeric values of the projection optical system 2. As shown in FIG. 13(a), the distance in air (optical distance, projection distance) V5 between the first reflective surface 31a and the screen 9 is "−469 mm" at the first projection position P1 and is "−1449 mm" at the second projection position P2. In the projection optical system 2, when the projecting distance V5 changes between the first projection position P1 and the second projection position P2, focusing is carried out by changing the distance in air V1(d2) between the positive lens L1 and the positive lens L2, the distance in air V2(d13) between the positive lens L8 and the positive lens L9, the distance in air V3(d20) between the positive lens L12 and the positive lens L13, and the distance in air V4(d22) between the positive lens L13 and the positive lens L14.

Figure 14:
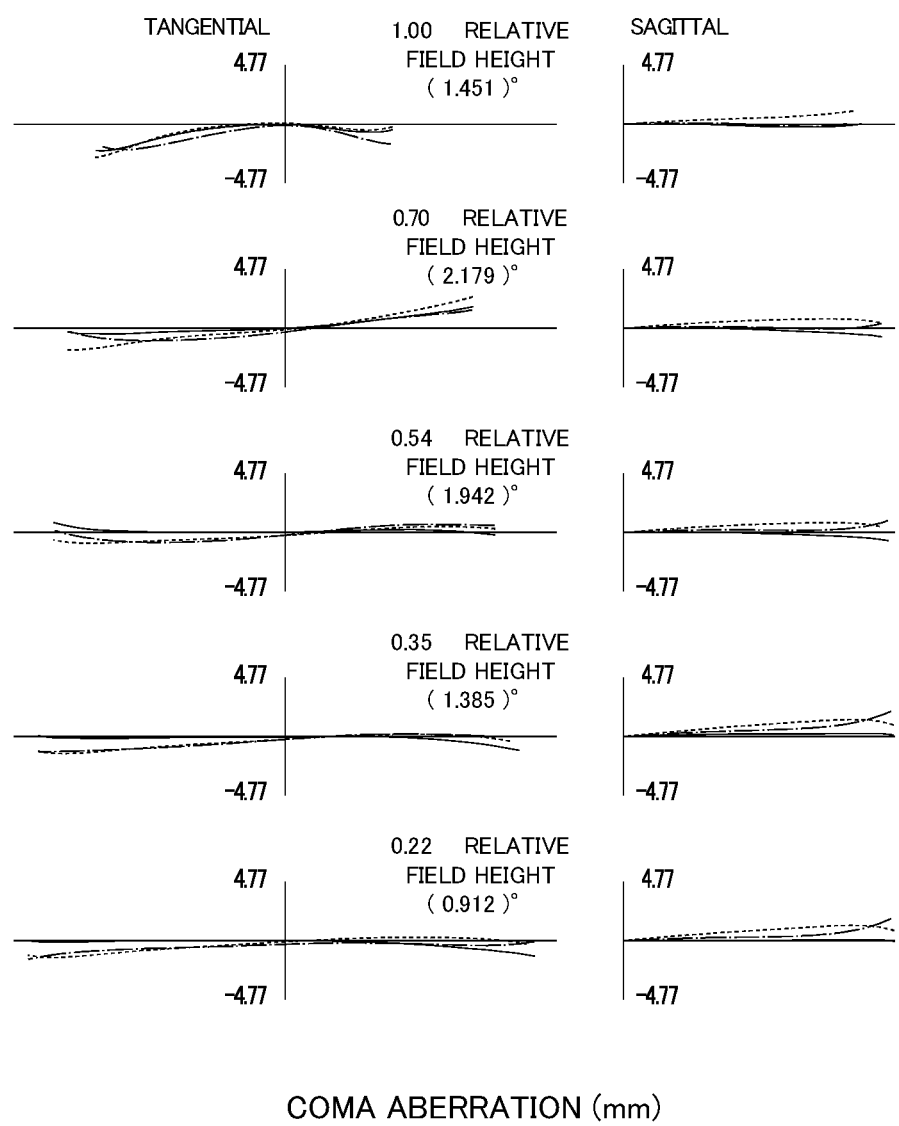
FIG. 14 is a coma aberration graph at the first projection position of the projection optical system according to the second embodiment.
Figure 15:
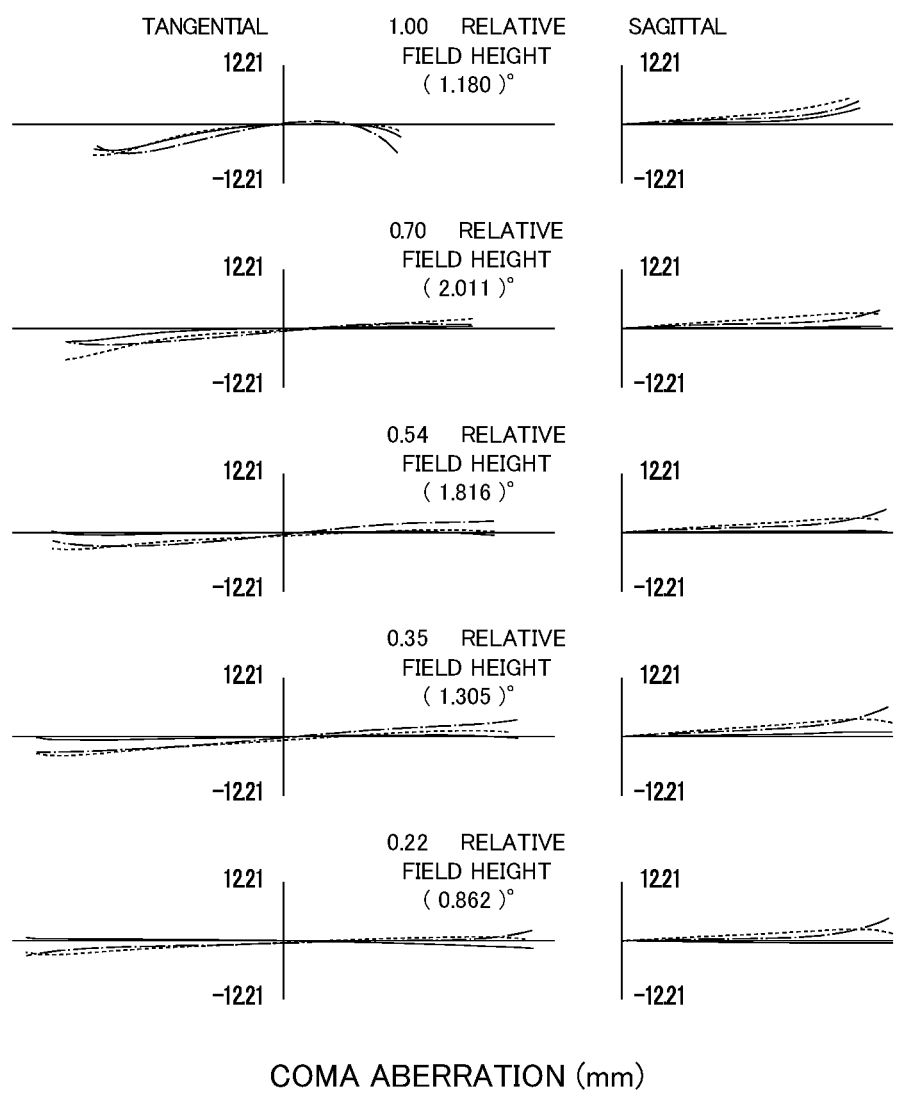
FIG. 15 is a coma aberration graph at the second projection position of the projection optical system according to the second embodiment.
Figure 16:
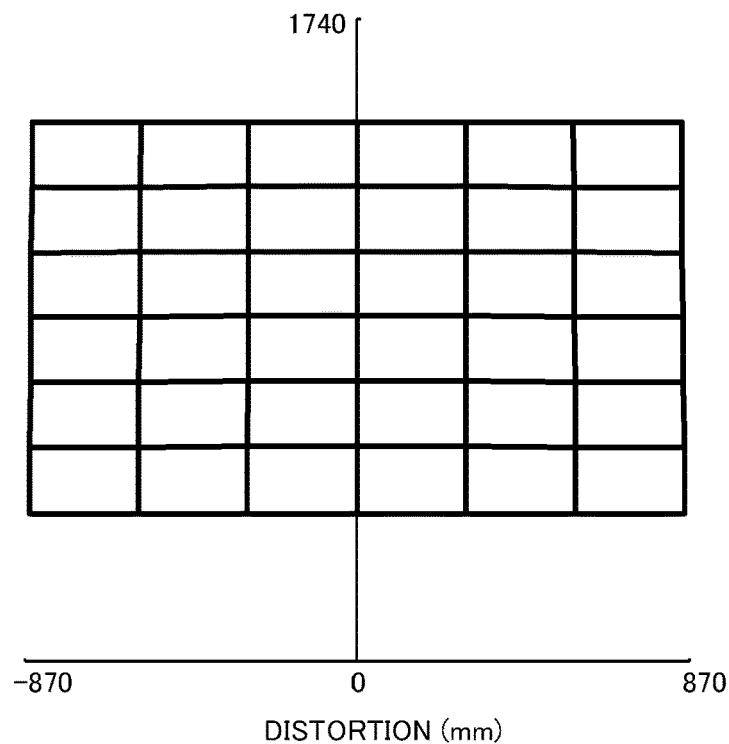
FIG. 16 is a distortion graph at the first projection position of the projection optical system according to the second embodiment.
Figure 17:
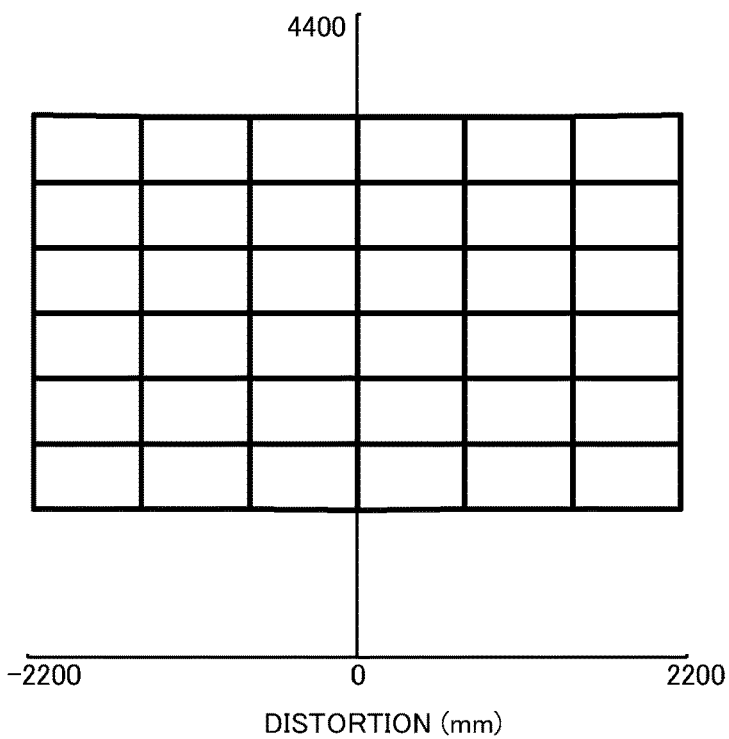
FIG. 17 is a distortion graph at the second projection position of the projection optical system according to the second embodiment.

FIG. 14 shows a coma aberration graph at the first projection position P1 of the projection optical system 2. FIG. 15 shows a coma aberration graph at the second projection position P2 of the projection optical system 2. FIG. 16 shows a distortion graph at the first projection position P1 of the projection optical system 2. FIG. 17 shows a distortion graph at the second projection position P2 of the projection optical system 2. As shown in FIGS. 14 to 17, all of the aberrations are favorably corrected and it is possible to project sharp enlarged images. Note that coma aberration is shown for a wavelength of 650 nm (dotted line), a wavelength of 550 nm (solid line), and a wavelength of 440 nm (dot-dash line).

Figure 18:
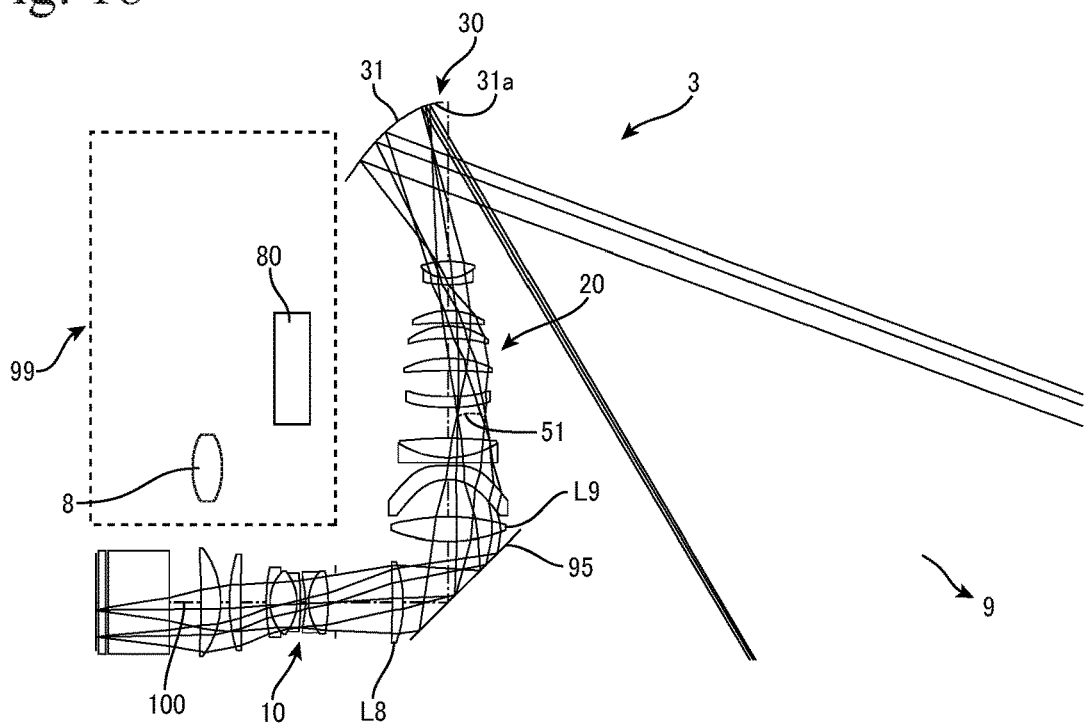
FIG. 18 is a light ray diagram of a projection optical system according to a third embodiment.

FIG. 18 shows a projection optical system 3 according to a third embodiment. The projection optical system 3 is a projection optical system of a type where the projection optical system 2 is bent midway in the first refractive optical system 10. The first refractive optical system 10 of the projection optical system 3 includes a mirror 95 that bends the optical axis 100 at substantially a right angle in a space between the positive lens L8 and the positive lens L9. In the projection optical system 3, by having the mirror 95 bend the first refractive optical system 10, it is possible to reduce the overall length of the projection optical system 3. In addition, by disposing the illumination optical system 8 and the focusing mechanism 80 in a space 99 formed by bending the first refractive optical system 10, it is possible to miniaturize a projector 6 including the projection optical system 3, the illumination optical system 8, and the like.

Figure 19:
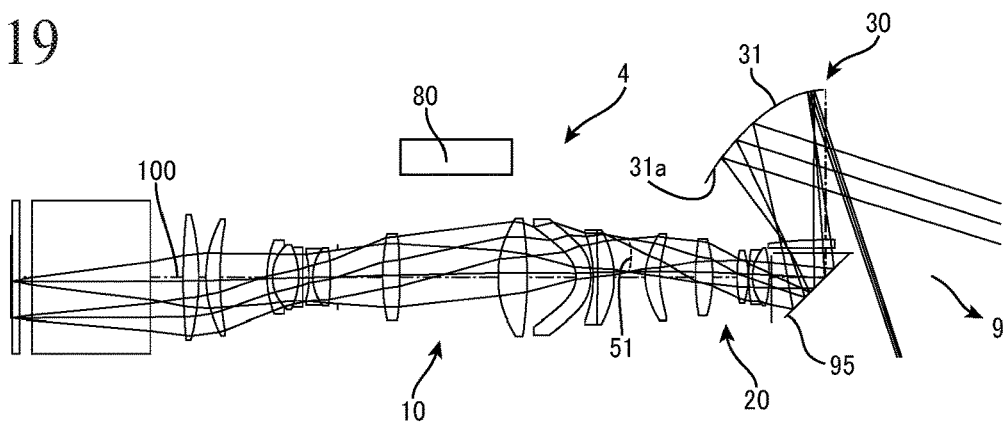
FIG. 19 is a light ray diagram of a projection optical system according to a fourth embodiment.
Figure 20:
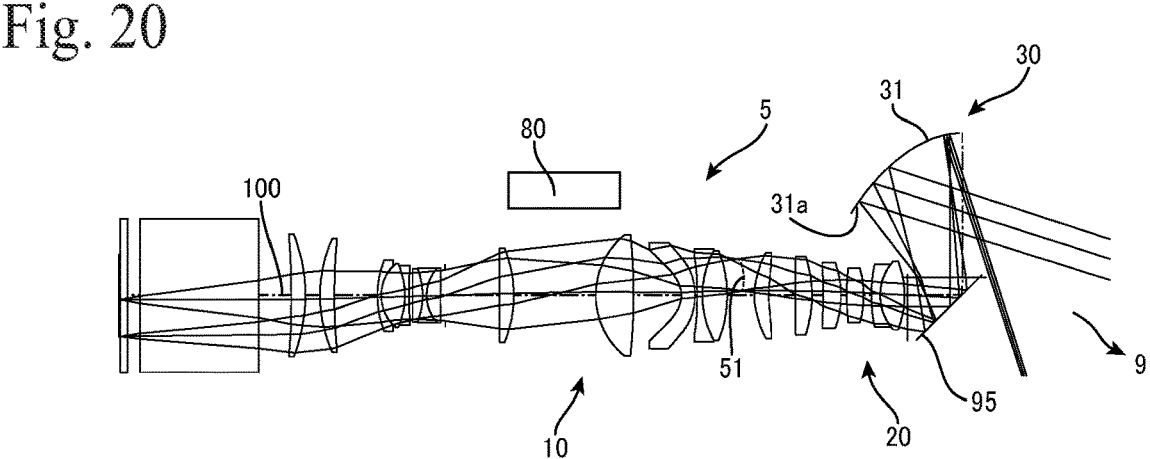
FIG. 20 is a light ray diagram of a projection optical system according to a fifth embodiment.

FIG. 19 shows a projection optical system 4 according to a fourth embodiment. This projection optical system 4 is a projection optical system of a type where the projection optical system 2 is bent midway in the second refractive optical system 20. In addition, FIG. 20 shows a projection optical system 5 according to a fifth embodiment. The projection optical system 5 is a projection optical system of a type where the projection optical system 2 is bent between the second refractive optical system 20 and the mirror 31. As shown in FIGS. 19 and 20, in the projection optical systems 4 and 5, since it is possible to miniaturize the second refractive optical system 20 and the mirror 31, even if the projection direction of the projection light is changed in the periphery of the mirror 31, it is possible to suppress interference between the projection light reflected by the first reflective surface 31a and the second refractive optical system 20, the mirror 31, and the like. Such projection optical systems 3 to 5 may be equipped with a plurality of prisms and/or mirror (mirror surfaces) for bending the optical path multiple times at appropriate positions.

Note that the present invention is not limited to such embodiments and includes the devices defined by the range of the patent claims. When carrying out focusing in response to changes in the peripheral temperature of the projection optical system, the entire refractive optical systems of the first refractive optical system and the second refractive optical system may be moved, the second refractive optical system and the first reflective optical system may be moved, the entire projection optical systems of the first refractive optical system, the second refractive optical system, and the first reflective optical system may be moved, or only the first reflective optical system may be moved. It is also possible to use the optical system including the first refractive optical system, the second refractive optical system, and the first reflective optical system in a variety of applications including not only projection but also image pickup. Also, the lens surfaces and mirror surfaces (reflective surfaces) included in the projection optical systems may be spherical or aspherical surfaces with rotational symmetry, or such surfaces may be surfaces that do not exhibit rotational symmetry, for example, free-formed curved surfaces. Also, the optical axis of the first refractive optical system and the optical axis of the second refractive optical system may be shared or may be shifted. Also, the projection optical system may be a fixed focus type that does not carry out zooming or may be a variable focus (zoom) type that carries out zooming. Also, at least one lens included in the first refractive optical system and the second refractive optical system and/or the reflective surface included in the first reflective optical system may be off-center with respect to the optical axis. In this case, the optical axes of the respective optical systems include the optical axes of the main optical elements. Also, the optical axis of the first refractive optical system and the optical axis of the second refractive optical system may be shared or may be off-center (shifted). Also, another refractive optical system may be provided on an enlargement side of the first reflective optical system. It is also possible to use anamorphic optical elements for the lenses and/or reflective surfaces included in the projection optical system

The invention claimed is:

1. A projection optical system that projects from a first image plane on a reducing side onto a second image plane on an enlargement side, comprising:
   a first refractive optical system that forms a first intermediate image on the enlargement side using light incident from the reducing side;
   a second refractive optical system that forms the first intermediate image on the reducing side into a second intermediate image on the enlargement side, wherein the first intermediate image and the second intermediate image are formed on opposite sides of an optical axis; and
   a first reflective optical system including a first reflective surface with positive refractive power that is positioned on the enlargement side of the second intermediate image,
   wherein the second refractive optical system includes a first focus lens group that moves when focusing is carried out and a plurality of lenses that are fixed when focusing is carried out, and the first focus lens group includes a first distance correcting lens group that moves when focusing is carried out in response to changes in an optical distance between the first reflective surface and the second image plane, the first distance correction lens group being located closer to the first intermediate image than any lenses in the second refractive optical system that are fixed when focusing is carried out, and the first refractive optical system includes a fixed lens that is positioned closer to the first intermediate image than any other lenses in the first refractive optical system.

2. The projection optical system according to claim 1,
wherein the first distance correcting lens group is composed of a first lens that is positioned closer to a reducing side of the second refractive optical system than any other lens in the second refractive optical system.

3. The projection optical system according to claim 1,
wherein the first refractive optical system includes a second focus lens group that moves when focusing is carried out.

4. The projection optical system according to claim 1,
wherein the first reflective surface does not move when focusing is carried out in response to changes in an optical distance between the first reflective surface and the second image plane.

5. The projection optical system according to claim 1,
wherein the fixed lens of the first refractive optical system is a negative lens of meniscus type with a convex surface oriented toward the enlargement side, and
the first distance correcting lens group includes a positive lens of meniscus type positioned closer to the first intermediate image than any other lens in the second refractive optical system, wherein the positive lens has a convex surface oriented toward the reducing side.

6. The projection optical system according to claim 5,
wherein the convex surface of the negative lens and the convex surface of the positive lens are aspherical surfaces.

7. The projection optical system according to claim 1,
wherein a Petzval sum PTZ1 of the first refractive optical system, a third-order aberration coefficient DST1 of distortion of the first refractive optical system, a third-order aberration coefficient TCO1 of coma aberration of the first refractive optical system, a Petzval sum PTZ2 of the second refractive optical system, a third-order aberration coefficient DST2 of distortion of the second refractive optical system, and a third-order aberration coefficient TCO2 of coma aberration of the second refractive optical system satisfy the following conditions:

|PTZ1|<|PTZ2|

|DST1|<|DST2|

−0.5<|TCO1|−|TCO2|<0.5.

8. The projection optical system according to claim 1,
wherein a curvature of field FC1 of the first intermediate image and a curvature of field FC2 of the second intermediate image satisfy the following conditions:

0<FC1×FC2

0.03<|FC1|.

9. A projector apparatus comprising:
the projection optical system according to claim 1; and
a light modulator that forms an image at the first image plane.

10. The projection optical system of claim 1, wherein the projection optical system is non-telecentric on the incident side and does not carry out zooming.

11. The projection optical system according to claim 1,
wherein the first distance correcting lens group includes a first lens positioned closer to the first intermediate image than any other lens in the second refractive optical system, wherein the first lens has a convex surface oriented toward the reducing side, and
the first intermediate image is formed tilted to the reducing side as a distance from the optical axis increases.

12. A projector system comprising:
a projection optical system that projects from a first image plane on a reducing side to a second image plane on an enlargement side; and
a focusing mechanism that carries out focusing of the projection optical system,
wherein the projection optical system includes:
a first refractive optical system that forms a first intermediate image on the enlargement side using light incident from the reducing side;
a second refractive optical system that forms the first intermediate image on the reducing side into a second intermediate image on the enlargement side, wherein the first intermediate image and the second intermediate image are formed on opposite sides of an optical axis, wherein the second refractive optical system includes a first lens that moves when focusing is carried out and a plurality of lenses the are fixed when focusing is carried out; and
a first reflective optical system including a first reflective surface with positive refractive power that is positioned on the enlargement side of the second intermediate image, and
wherein the focusing mechanism includes a mechanism that moves the first lens of the second refractive optical system, wherein the first lens is positioned closer to the intermediate image than any lenses in the second refractive optical system that are fixed when focusing is carried out;
wherein the first refractive optical system includes a fixed lens that is positioned closer to the intermediate image than any other lenses in the first refractive optical system.

13. The projector system of claim 12, wherein the projection optical system is non-telecentric on the incident side and does not carry out zooming.

14. The projector system according to claim 12,
wherein the first lens of the second refractive optical system has a convex surface oriented toward the reducing side, and the first intermediate image is formed tilted to the reducing side as a distance from the optical axis increases.

15. A method of carrying out focusing of a projection optical system that projects from a first image plane on a reducing side to a second image plane on an enlargement side,
wherein the projection optical system includes:
a first refractive optical system that forms a first intermediate image on the enlargement side using light incident from the reducing side;
a second refractive optical system that forms the first intermediate image on the reducing side into a second intermediate image on the enlargement side, wherein the first intermediate image and the second intermediate image are formed on opposite sides of an optical axis, wherein the second refractive optical system includes a first distance correcting lens group that moves when focusing is carried out and a plurality of lenses the are fixed when focusing is carried out; and a first reflective optical system including a first reflective surface with positive refractive power that is positioned on the enlargement side of the second intermediate image, and the method comprises moving the first distance correcting lens group when focusing is carried out in response to changes in an optical distance between the first reflective surface and the second image plane, wherein the first distance correcting lens group is positioned closer to the intermediate image than any lenses in the second refractive optical system that are fixed when focusing is carried out; and when focusing is carried out by moving the first distance correcting lens group, a lens of the first refractive optical system that is positioned closer the first intermediate image than any other lenses in the first refractive optical system remains fixed.

* * * * *